US008204385B2

(12) United States Patent
Zheng et al.

(10) Patent No.: US 8,204,385 B2
(45) Date of Patent: Jun. 19, 2012

(54) OPTICAL DEVICE WITH REDUCED THERMAL TUNING ENERGY

(75) Inventors: Xuezhe Zheng, San Diego, CA (US); Ashok V. Krishnamoorthy, San Diego, CA (US); John E. Cunningham, San Diego, CA (US); Guoliang Li, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 533 days.

(21) Appl. No.: 12/493,509

(22) Filed: Jun. 29, 2009

(65) Prior Publication Data

US 2010/0329685 A1    Dec. 30, 2010

(51) Int. Cl.
*H04B 10/12* (2006.01)
*H04J 14/02* (2006.01)
(52) U.S. Cl. ............. 398/182; 398/198; 398/91; 398/79
(58) Field of Classification Search ............... 398/91
See application file for complete search history.

(56) References Cited

U.S. PATENT DOCUMENTS

| | | | |
|---|---|---|---|
| 7,848,599 B2 * | 12/2010 | Cunningham et al. | 385/1 |
| 7,977,622 B2 * | 7/2011 | McLaren et al. | 250/227.11 |
| 8,078,013 B2 * | 12/2011 | Li et al. | 385/1 |
| 2006/0088319 A1 * | 4/2006 | Morton | 398/79 |
| 2006/0198416 A1 * | 9/2006 | Yamazaki | 372/94 |
| 2010/0247029 A1 * | 9/2010 | Li et al. | 385/14 |
| 2010/0290790 A1 * | 11/2010 | Murthy et al. | 398/192 |
| 2011/0176816 A1 * | 7/2011 | Ooi et al. | 398/184 |
| 2011/0235962 A1 * | 9/2011 | Shubin et al. | 385/14 |
| 2011/0280579 A1 * | 11/2011 | McLaren et al. | 398/79 |

OTHER PUBLICATIONS

P.Saeung P.P. Yupapin; Title effect of multiple ring resonator filters modelling by a graphical approach; Jul. 2007; optical enegineering vol. 46(7); pp. 1-6.*

* cited by examiner

*Primary Examiner* — Kenneth N Vanderpuye
*Assistant Examiner* — Amritbir Sandhu
(74) *Attorney, Agent, or Firm* — Park, Vaughan, Fleming & Dowler LLP; Steven E Stupp

(57) ABSTRACT

An optical device that includes multiple optical modulators having actual operating wavelengths at a given temperature is described. Because of differences between the actual operating wavelengths and target operating wavelengths of the optical modulators, heating elements may be used to thermally tune the optical modulators so that the actual operating wavelengths match corresponding carrier wavelengths in a set of optical signals. Furthermore, control logic in the optical device may assign the optical modulators to the corresponding carrier wavelengths based at least on differences between the carrier wavelengths and the actual operating wavelengths, thereby reducing an average thermal tuning energy associated with the heating elements.

20 Claims, 7 Drawing Sheets

OPTICAL DEVICE WITH REDUCED THERMAL TUNING ENERGY

GOVERNMENT LICENSE RIGHTS

This invention was made with United States Government support under Agreement No. HR0011-08-9-0001 awarded by the Defense Advanced Research Projects Administration. The United States Government has certain rights in the invention.

BACKGROUND

1. Field

The present disclosure relates to an optical device for communicating optical signals. More specifically, the present disclosure relates to an optical device with reduced thermal tuning energy.

2. Related Art

Wavelength division multiplexing (WDM) is widely used to communicate modulated data at different carrier wavelengths on a common optical waveguide. WDM can overcome optical-fiber congestion, which is a potential problem in optical modules that include parallel optical transceivers with one channel per optical fiber. In particular, by significantly reducing the number of optical fibers per optical module, WDM can simplify optical modules, thereby reducing their cost and size.

In dense WDM (DWDM), a narrow spacing between adjacent wavelengths is used. This is typically achieved by modulating data directly onto a highly stable optical carrier, and then combining multiple carriers in an optical fiber. DWDM allows a large number of channels to be accommodated within a given wavelength band, and thus offers high performance.

In DWDM systems, a variety of optical devices are used as: optical waveguides, optical modulators, optical multiplexers (such as add filters), optical de-multiplexers (such as drop filters), optical proximity couplers, optical filters, optical switches and optical detectors. While some of these optical devices (such as optical waveguides, optical proximity couplers and optical detectors) are broadband components that are relatively insensitive to ambient temperature changes and fabrication variation, wavelength-selective optical devices (such as resonator-based optical modulators, optical multiplexers, optical filters and optical de-multiplexers) can be very sensitive to these changes and variations. In order to compensate for the corresponding changes in actual operating wavelengths of these wavelength-selective optical devices (relative to pre-determined desired or target operating wavelengths), a given wavelength-selective optical device is typically phase-tuned to a particular carrier wavelength of a given channel.

Thermal tuning is a popular tuning technique because it provides the ability to produce large phase shifts. Existing thermal tuning techniques include direct heating (which is implemented by doping in an optical waveguide) and indirect heating (in which a heater is proximate to the optical waveguide). Typically, the direct-heating technique is more energy-efficient than indirect heating, but it can prevent the optical waveguide from performing additional functions (because of the constraint on the doping density), and it can introduce additional optical losses due to free-carrier absorption (which can degrade the quality factor of an optical resonator).

In principle, optical devices can be made on silicon substrates, because silicon provides many benefits for optical communication. For example, the high index-of-refraction contrast between silicon and silicon dioxide can be used to create sub-micron optical waveguides to confine light with spatial densities that are up to 100× larger than in a single-mode optical fiber. Furthermore, by using silicon-on-insulator (SOI) technology, a silicon optical waveguide can be surrounded by silicon dioxide on all four sides, which facilitates low-loss, on-chip optical waveguides and active devices (such as optical detectors and optical modulators). Silicon-based optical devices can be used to implement a wide variety of optical components for use in WDM communication. These silicon-based optical devices offer numerous advantages, including: miniaturization, low-energy modulation, the ability to integrate with other devices in silicon, and/or the ability to leverage the large, existing silicon manufacturing infrastructure.

Unfortunately, there are problems associated with silicon-based optical devices. A notable problem is the high thermal conductivity of silicon. While this helps remove the heat dissipated by electrical circuits, it can make it more difficult to thermally tune a silicon-based optical device. In particular, because the actual operating wavelength of a silicon-based optical device (such as the resonant wavelength of an optical resonator) strongly depends on temperature, the actual operating wavelength is typically tuned using either direct or indirect heating to change the operating temperature of the silicon-based optical device. However, the high thermal conductivity of silicon results in excessive thermal coupling to the surrounding environment. Consequently, thermal tuning of silicon-based optical devices often consumes a disproportionately large amount of energy (typically, 50-100 mW for a phase shift of 180°). This high power consumption can offset the advantages provided by silicon, and makes it more difficult to use silicon-based optical devices to implement optical communication (such as WDM) in computing systems (especially in systems that have multiple instances of the optical devices).

Hence, what is needed is an optical device that can be thermally tuned without the above-described problems.

SUMMARY

One embodiment of the present disclosure provides an optical device deposited on a substrate. This optical device includes an optical waveguide that receives a set of optical signals, where a given optical signal has a carrier wavelength, and carrier wavelengths of the set of optical signals span a band of wavelengths. A transmitter in the optical device includes transmitter heating elements, and a group of transmitter optical modulators that are optically coupled to the optical waveguide and thermally coupled to corresponding transmitter heating elements that thermally tune the group of transmitter optical modulators. Note that the group of transmitter optical modulators have: target operating wavelengths at a given temperature, actual operating wavelengths at the given temperature, and free spectral ranges. Furthermore, transmitter optical modulators in the group of transmitter optical modulators have different target operating wavelengths, and the free spectral ranges around the target operating wavelengths encompass the band of wavelengths. Additionally, control logic in the optical device assigns transmitter optical modulators in the group of transmitter optical modulators to corresponding carrier wavelengths based on differences between the carrier wavelengths and the actual operating wavelengths, thereby reducing an average thermal tuning energy associated with the transmitter heating elements.

In some embodiments, the control logic assigns the transmitter optical modulators to the corresponding carrier wavelengths to minimize the average thermal tuning energy. Furthermore, the control logic may dynamically assign the transmitter optical modulators to the corresponding carrier wavelengths during operation of the optical device. Alternatively or additionally, the control logic may assign the transmitter optical modulators to the corresponding carrier wavelengths during a calibration mode. Note that an average tuning range of the transmitter optical modulators may be significantly less than one half of an average of the free spectral ranges of the transmitter optical modulators.

Moreover, the transmitter optical modulators may be spatially cascaded. Alternatively or additionally, the optical device may include an optical multiplexer that optically couples the group of transmitter optical modulators to the optical waveguide. Furthermore, the optical device may include optical sources, coupled to the optical waveguide, which provide the set of optical signals.

Note that the transmitter optical modulators may include ring resonators. Furthermore, different target operating wavelengths of the group of transmitter optical modulators may be associated with different optical path lengths in the ring resonators.

In some embodiments, differences between spacings of the target operating wavelengths of the transmitter optical modulators and a spacing of the carrier wavelengths provide a Vernier effect. This may ensure that, statistically, over the area of a substrate (such as in an integrated circuit), there is a small variation between the actual operating wavelengths and the carrier wavelengths, which may make it easier to thermally tune the transmitter optical modulators.

Additionally, the number of transmitter optical modulators in the group of transmitter optical modulators may equal the number of carrier wavelengths. However, in other embodiments the number of transmitter optical modulators in the group of transmitter optical modulators is greater than the number of carrier wavelengths. In these embodiments, at least one of the transmitter optical modulators in the group of transmitter optical modulators is not assigned to a corresponding carrier wavelength and remains unused during operation of the optical device.

In some embodiments, the optical waveguide receives multiple sets of optical signals having carrier wavelengths that span different bands of wavelengths, which define a spectral range of the optical device. Furthermore, the optical device may include multiple instances of the group of transmitter optical modulators, and the control logic may assign transmitter optical modulators in a given group of transmitter optical modulators to corresponding carrier wavelengths in a given set of optical signals.

In some embodiments, the optical device includes a receiver. This receiver may include receiver heating elements, and a group of wavelength drop filters that are optically coupled to the optical waveguide and thermally coupled to corresponding receiver heating elements that thermally tune the group of wavelength drop filters. Note that the group of wavelength drop filters may have: target operating wavelengths at the given temperature, actual operating wavelengths at the given temperature, and free spectral ranges. Furthermore, wavelength drop filters in the group of wavelength drop filters may have different target operating wavelengths, and the free spectral ranges around the target operating wavelengths of the group of wavelength drop filters may encompass the band of wavelengths. Additionally, the receiver may include detectors that are optically coupled to the corresponding wavelength drop filters in the group of wavelength drop filters. In these embodiments, the control logic assigns wavelength drop filters in the group of wavelength drop filters to corresponding carrier wavelengths based at least on differences between the carrier wavelengths and the actual operating wavelengths of the wavelength drop filters in the group of wavelength drop filters, thereby reducing an average thermal tuning energy associated with the receiver heating elements.

Another embodiment provides a computer system that includes an integrated circuit that includes the optical device.

Another embodiment provides a method for configuring the optical device, which may be performed by the control logic. During this method, the control logic determines the differences between the carrier wavelengths in the set of optical signals and the actual operating wavelengths at the given temperature of the group of optical modulators. Then, the control logic assigns optical modulators in the group of optical modulators to corresponding carrier wavelengths based at least on the determined differences, thereby reducing the average thermal tuning energy associated with the heating elements.

BRIEF DESCRIPTION OF THE FIGURES

Note that like reference numerals refer to corresponding parts throughout the drawings. Moreover, multiple instances of the same part are designed by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of an optical device, a computer system that includes the optical device, and a method for configuring the optical device are described. This optical device includes multiple optical modulators having actual operating wavelengths at a given temperature. Because of differences between the actual operating wavelengths and target operating wavelengths of the optical modulators, heating elements may be used to thermally tune the optical modulators so that the actual operating wavelengths match corresponding carrier wavelengths in a set of optical signals. Furthermore, control logic in the optical device may assign the optical modulators to the corresponding carrier wavelengths based at least on differences between the carrier wavelengths and the actual operating wavelengths. Using this configuration technique, the average tuning range of the optical modulators can be reduced to a fraction of a 180° phase shift. Consequently, this configuration technique allows the average thermal tuning energy associated with the heating elements to be reduced by up to 5-10 times the average thermal tuning energy associated with existing thermal tuning techniques.

Figure 1A:
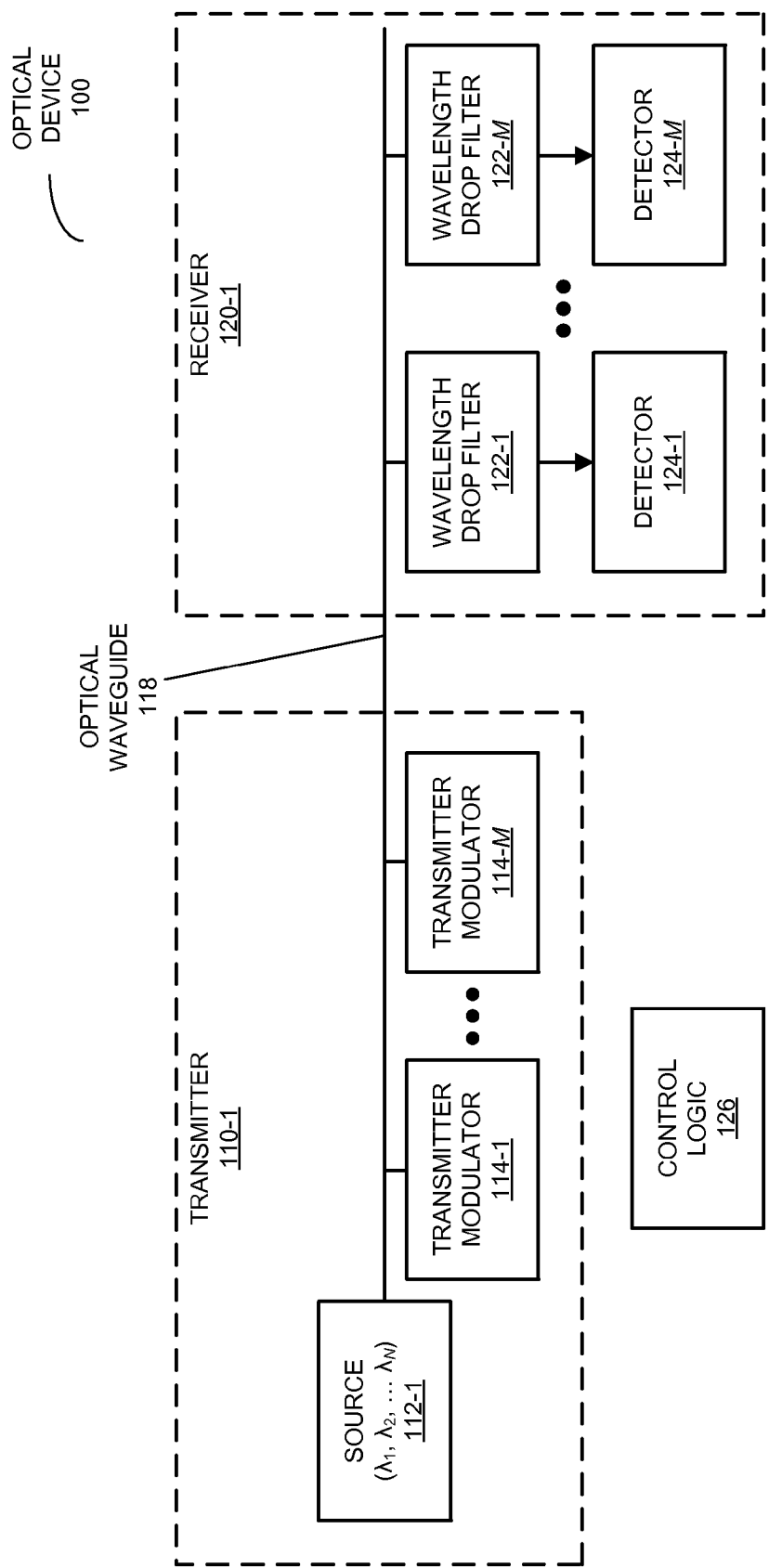
FIG. 1A is a block diagram illustrating an optical device in accordance with an embodiment of the present disclosure.

We now describe embodiments of an optical device. A silicon-photonic WDM link for inter- or intra-chip communication typically includes a link with several channels, which each have one or more associated carrier wavelengths ($\lambda_i$). This is shown in FIG. 1A, which presents a block diagram illustrating an optical device 100 that may be implemented on one or more substrates. In this optical device, source 112-1 (such as a laser or an optical waveguide) in transmitter 110-1 provide a set of optical signals having carrier wavelengths $\lambda_i$, which are typically predefined and fixed, and which collectively span a band of wavelengths (or a bandwidth). For example, the carrier wavelengths may correspond to 4, 8, 16, 32 or 64 channels in a WDM link. Information (such as data) is communicated to receiver 120-1 by modulating and wavelength multiplexing these optical signals using parallel spatially cascaded transmitter optical modulators 114 onto optical waveguide 118. At receiver 120-1, the modulated optical signals are separated using wavelength drop filters 122, and the information is recovered using corresponding optical detectors 124.

While a wide variety of optical components can be used to implement transmitter optical modulators 114 and wavelength drop filters 122, in the discussion that follows ring resonators are used as an illustrative example. As a high-Q device, a ring modulator has narrow bandwidth for any particular resonance order, making it a very good wavelength selective device. But a ring resonator also exhibits many resonance orders. These resonance orders offer similar (degenerate) optical performance within a fairly wide wavelength range, which makes the ring modulator a quasi-broadband device. Although it can be difficult to fabricate a ring modulator such that its operating wavelength is aligned with a predefined wavelength, the resonance closest to the predefined-wavelength channel can be selected to minimize any tuning required. In addition, because ring resonators are wavelength selective, multiplexing may not be needed after modulation stage if the multiple un-modulated wavelengths are input to transmitter 110-1 on a common waveguide. This architecture allows a set of cascaded rings to simultaneously provide both signal modulation and wavelength multiplexing functionality, which simplifies the architecture of optical device 100 relative to optical device 150 (described below with reference to FIG. 1B). In order to implement this architecture with a channel spacing of $\delta\lambda$, each ring device may need to have a free spectral range (FSR) that is larger than $n\delta\lambda$, where n is number of wavelength channels.

Because silicon-based ring resonator modulators are high-Q devices, they are usually wavelength selective and sensitive to ambient temperature change. Furthermore, because of fabrication tolerances, it can be difficult to achieve ring resonance at predefined wavelength grids. Typically, tuning is used in applications of ring modulators in WDM interconnects, primarily to compensate for static resonance offset associated with fabrication tolerances, and secondly to overcome any dynamic resonance offset caused by modulation and/or ambient temperature change. Consequently, transmitter optical modulators 114 and wavelength drop filters 122 may be thermally and/or electrically tuned. In the discussion that follows, thermal tuning is used as an illustration.

Figure 2:
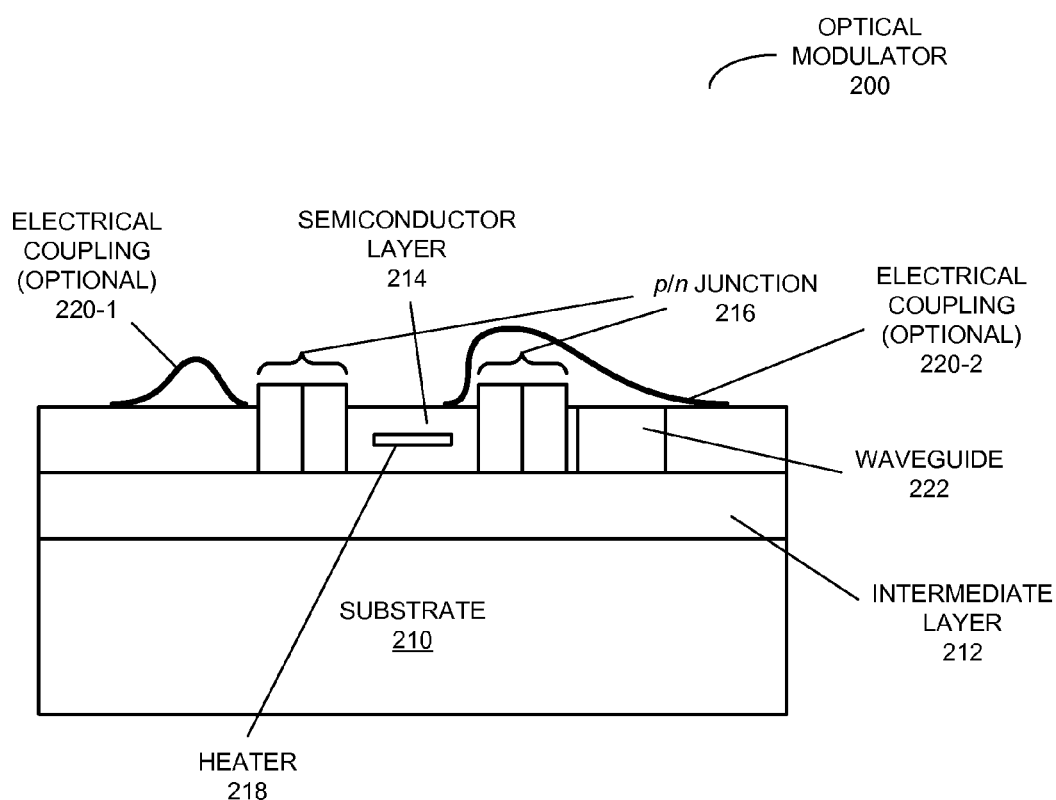
FIG. 2 is a block diagram illustrating an optical modulator in the optical devices in FIGS. 1A and 1B in accordance with an embodiment of the present disclosure.

As described further below with reference to FIG. 2, a given optical modulator (such as transmitter optical modulator 114-1 or wavelength drop filter 122-1) can be thermally tuned using a heater element. In particular, each of the transmitter optical modulators 114 and the wavelength drop filters 122 may have target or design operating wavelength(s) at a given temperature and a FSR. The target operating wavelength(s) for the transmitter optical modulators 114 (or the wavelength drop filters 122) may be different than one another (for example, different target operating wavelengths may be associated with different optical path lengths in ring resonators in the optical modulators). These target operating wavelength(s), in conjunction with the FSRs, may encompass the band of wavelengths of the optical signals. However, because of variation during the fabrication process, the actual operating wavelength(s) may be different from the target operating wavelength(s). Consequently, in response to signals from control logic 126, heater elements in the optical modulators may vary the local temperatures in the optical modulators to thermally tune the actual operating wavelengths so that they better match the carrier wavelengths.

In addition, instead of using predefined assignments of transmitter optical modulators 114 (and/or wavelength drop filters 122) to corresponding carrier wavelengths in the optical signals, control logic 126 may assign transmitter optical modulators 114 (and/or wavelength drop filters 122) to corresponding carrier wavelengths based at least on differences between the carrier wavelengths and the actual operating wavelengths, thereby reducing an average tuning range, and thus, an average thermal tuning energy, associated with heating elements in transmitter optical modulators 114 (and/or wavelength drop filters 122). For example, the average tuning range may be significantly less than one half of an average of the FSRs of transmitter optical modulators 114 (and/or wavelength drop filters 122). In some embodiments, control logic 126 assigns transmitter optical modulators 114 (and/or wavelength drop filters 122) to corresponding carrier wavelengths in order to minimize the average thermal tuning energy.

Note that this assignment may be performed: once, continuously or as needed. Thus, control logic 126 may dynamically perform the assignment during operation of optical device 100. Alternatively or additionally, control logic 126 may perform the assignment during a calibration mode.

Figure 1B:
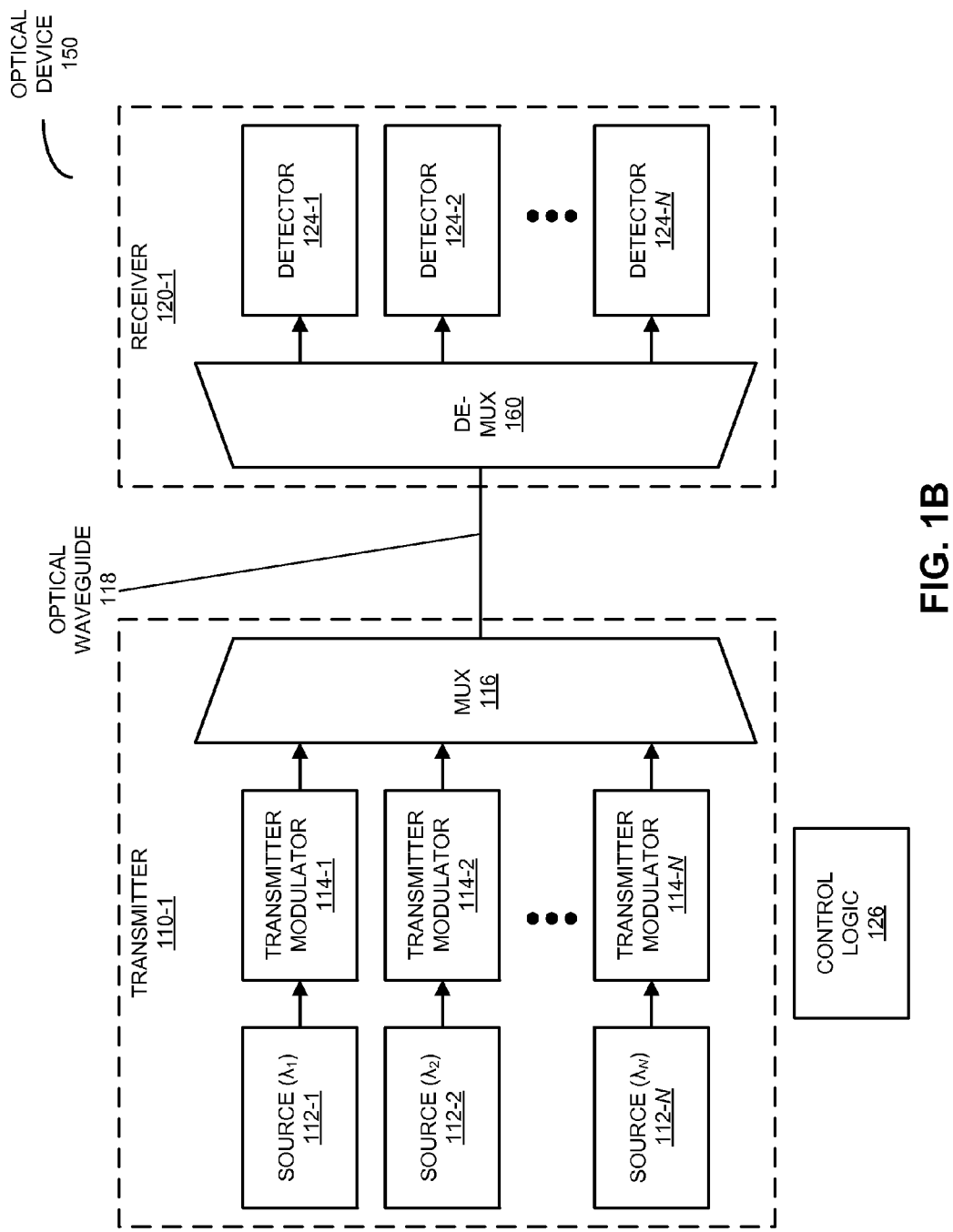
FIG. 1B is a block diagram illustrating an optical device in accordance with an embodiment of the present disclosure.

As shown in FIG. 1B, which presents a block diagram illustrating an optical device 150 that may be implemented on one or more substrates, in other embodiments, rather than simultaneously modulating and multiplexing the spatially cascaded transmitter optical modulators 114 (FIG. 1A), the information is communicated to receiver 120-1 by modulating optical signals provided by sources 112 using transmitter optical modulators 114, and the resulting modulated optical signals are multiplexed onto optical waveguide 118 using optical multiplexer 116 (MUX). At receiver 120-1, the modulated optical signals are separated using optical de-multiplexer 160 (which performs de-multiplexing), and the information is recovered using optical detectors 124. FIG. 1B illustrates how broadband modulators, e.g. electro-absorption-based modulators (such as QCSE devices) are typically used. In particular, the wavelength channels are in separate sources (or waveguides) prior to modulation, and then multiplexed into a single optical waveguide 118 for transport across optical device 150. Note that in optical device 150, the configuration technique described below may be applied by control logic 126 to tune optical de-multiplexer 160.

Thermal modulation using heating elements in the optical modulators typically can only shift the actual operating wavelengths in one direction. As a consequence, depending on the difference between the actual operating wavelengths and the target operating wavelengths, the actual operating wavelengths of transmitter optical modulators 114 (and/or wavelength drop filters 122) may need to be shifted in the worst case all the way through 360°. In some embodiments, if the bandwidth encompassed by the optical modulators is larger than the bandwidth of the optical signals, it may be possible to reduce the average tuning energy even for this worst-case scenario. For example, there may be more transmitter optical modulators 114 (and/or wavelength drop filters 122) than the number of carrier wavelengths, i.e., M may be greater than N in optical device 150. In these embodiments, control logic 126 can leave at least one of transmitter optical modulators 114 (and/or wavelength drop filters 122) unassigned, and thus, unused, during operation of optical device 150. In particular, control logic 126 may only assign the transmitter optical modulators 114 (and/or wavelength drop filters 122) with actual operating wavelengths that are closest to the target operating wavelengths.

While FIGS. 1A and 1B illustrate WDM links with a transmitter 110-1 and receiver 120-1, in some embodiments there are multiple sets of optical signals and corresponding multiple instances of transmitters 110 and receivers 120.

We now describe the optical modulators in more detail. For a silicon-based optical modulator, thermal tuning is often based on the increase in the index of refraction of silicon with increasing temperature. In particular, by changing the temperature in a ring optical waveguide in the optical modulator, the index of refraction, as well as the optical phase (which is proportional to the index of refraction) of the propagating laser light in the optical waveguide, can be tuned. This is shown in FIG. 2, which presents a block diagram illustrating a cross-sectional view of an optical modulator 200 in optical devices 100 (FIG. 1A) and 150 (FIG. 1B). This optical device includes: a substrate 210, an intermediate layer 212 deposited on the substrate 210, and a semiconductor layer 214 deposited on the intermediate layer 212. This semiconductor layer includes a thermally tunable resonant ring optical waveguide, as illustrated by p/n junction 216. (Note that the ring optical waveguide may be a ring resonator, so the two portions of p/n junction 216 shown in FIG. 2 are actually part of one continuous structure.) For example, substrate 210 may include silicon, intermediate layer 212 may include an oxide (such as silicon dioxide), and/or semiconductor layer 214 may include silicon. Therefore, substrate 210, intermediate layer 212 and semiconductor layer 214 may comprise a silicon-on-insulator (SOI) technology. Furthermore, silicon semiconductor layer 214 may be 0.5 µm thick and silicon-dioxide intermediate layer 212 may have a thickness between 0.001 and 10 µm.

As noted previously, a resonant wavelength of the ring optical waveguide may be a function of the temperature of p/n junction 216. In some embodiments, a heater 218 is implemented proximate to the ring optical waveguide in order to thermally tune the actual operating wavelength(s) of optical modulator 200. However, in other embodiments, resistive heating is implemented inside the ring optical waveguide (instead of using heater 218). For example, one or more heating elements may be integrated in the ring optical waveguide (for example, using implantation) and a controlled amount of current may be sourced from a tuning circuit to these heating elements.

Note that operating bias from a power source (not shown) for the ring optical waveguide may be provided by highly doped, low-resistance electrical modulator contacts via optional electrical couplings 220. Alternatively or additionally, these optional electrical couplings may provide electrical current (or voltage) to heater 218.

As shown in FIGS. 1A and 1B, a given instance of an optical device may include multiple optical modulators, such as optical modulator 200. Temperatures of the ring optical waveguides in each instance of the optical modulators may be individually programmed, so that one or more ring optical waveguides can have different temperatures than other ring optical waveguides in the optical modulators. Consequently, heating elements, such as heater 218, can be used to produce arbitrary, programmable thermal profiles across an array of optical modulators to create the necessary tuning, modulation and/or other functionality. Once the heaters or heating elements are turned on, the power to each may be chosen to increase the temperature of each optical modulator by the appropriate amount to achieve the desired operating temperature, and thus, the desired actual operating wavelengths. The temperature of each of the optical modulators may be regulated using a temperature control mechanism, such as biased temperature control.

In some operating conditions, the absolute wavelength range of the array of optical modulators may experience thermal drift. This can occur if the ambient temperature changes or if there is some global change in the temperature of substrate 210. However, even in this situation, active thermal management of the resonant wavelengths of the ring optical waveguides in the optical modulators will still produce and maintain the correct actual operating wavelengths as long as the chip does not experience thermal runaway. This possibility can be substantially mitigated if active cooling is also used to control and maintain the global temperature of substrate 210 at a pre-determined level.

We now describe an exemplary embodiment of the ring resonators in the optical modulators in optical devices 100 (FIG. 1A) and 150 (FIG. 1B) in more detail. The resonant wavelengths of a ring resonator satisfy the following formula.

$$n \cdot 2\pi R = m\lambda,$$

where n is the effective index of refraction of the ring optical waveguide, R is the radius of the ring resonator, and m is an integer. This equation can be re-expressed as $$\frac{\delta \lambda}{\lambda} = \frac{\delta R}{R} + \frac{\delta n}{n} \qquad (2)$$

When an optical modulator is designed, an effective index of refraction and a radius are typically assumed in order to obtain target resonant wavelength(s), and thus, target operating wavelength(s) of the optical modulator. However, as noted previously, because of fabrication inaccuracy, there can be an error in the radius ($\delta R$). Furthermore, the effective index of refraction can also vary from the design assumption because of effects such as: thickness variations in silicon across an SOI wafer, doping, inaccuracy in the width of the ring optical waveguide, surface roughness during fabrication, and/or ambient temperature changes. As indicated in Eqn. 2, changes in these parameters will cause a shift of the resonance wavelengths (and thus, the actual operating wavelengths) of the ring resonator.

Figure 3:
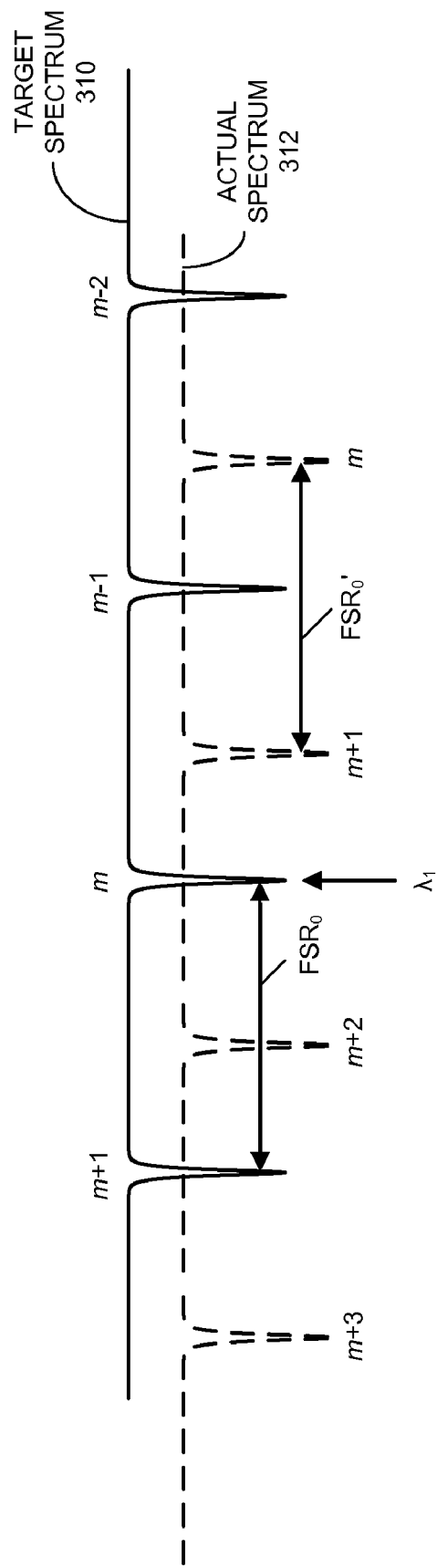
FIG. 3 is a drawing illustrating optical spectra of an optical modulator in the optical devices in FIGS. 1A and 1B in accordance with an embodiment of the present disclosure.

A target optical spectrum 310 and an actual optical spectrum 312 for a single ring resonator (such as in one of the optical modulators in FIGS. 1A and 1B) are shown in FIG. 3. In target optical spectrum 310, the $m^{th}$ order resonance of the ring resonator is at predefined wavelength $\lambda_1$ (such as one of the carrier wavelengths). In addition, the target free spectral range of the ring resonator is $FSR_0$, while the actual free spectral range of the ring resonator is $FSR_0'$. (Note that the FSR of the ring resonator defines the repeating values of resonance in the comb optical spectra.)

Because of the errors discussed above, the $m^{th}$ resonance in actual optical spectrum 312 is at a different wavelength than predefined wavelength $\lambda_1$, and the predefined wavelength $\lambda_1$ is not aligned with any resonance in the actual optical spectrum 312. Moreover, the fabrication errors can be significant, e.g., the offset in the index of refraction can be as large as 1%. As a consequence, the location of the $m^{th}$ order resonance of the ring resonator can be a few FSRs ranges away from the predefined wavelength $\lambda_1$. Fortunately, given the periodic nature of the optical spectrum of the ring resonator, the optical modulator will work if the nearest neighboring resonance is tuned to align with $\lambda_1$. The maximum amount of tuning, $\pm FSR_0'/2$ (or $\pi$ in phase), is used when $\lambda_1$ occurs in the middle of the two resonances in actual optical spectrum 312. However, as noted previously, the resulting average thermal tuning energy can be prohibitive for a group of optical modulators in an optical device.

In some designs, the radius of the ring resonators is as small as possible, which results in the largest possible FSR. For example, with a radius of 2-3 µm, the FSR may be 20 nm. This design has a low modulation or switching energy. However, the thermal tuning energy increases with the FSR. On the other hand, in order to reduce the tuning range, the FSR may be reduced by increasing the radius of the ring resonator. However, the thermal tuning energy may be similar (or unchanged) because of the increase in the size of the ring resonator.

Said differently, when there is only one ring modulator on a waveguide (i.e., when only a single wavelength goes through optical device 100 in FIG. 1A), a maximum tuning of up to one FSR may be needed to bring the nearest resonance of the ring resonator to its predefined-wavelength channel regardless of how big the offset is because of imperfect fabrication. In order to further reduce the tuning range, the FSR may be reduced. However, reducing the FSR typically requires increasing the ring size, which increases the tuning energy per unit nanometer of shift. These two effects often cancel out. In other words, the tuning energy remains similar because the device is larger even thought the tuning range is smaller.

However, with multiple ring modulators cascaded on one waveguide, the tuning range and tuning energy can be significantly reduced systematically. In general, ring-resonator devices with the same parameters fabricated in close proximity show good, repeatable uniformity with relative resonance offsets of about 1 nm (root-mean-square). Consequently, the tuning range can be reduced without significantly increasing the ring size using the cascaded rings. In particular, multiple ring resonators or optical modulators can be used and may be assigned to carrier wavelengths by control logic 126 (FIGS. 1A and 1B) based at least on their actual operating wavelengths. In this way, the ring resonators provide an effective optical spectrum associated with a large ring resonator, which reduces the average tuning distance and the average thermal tuning energy.

Figure 4:
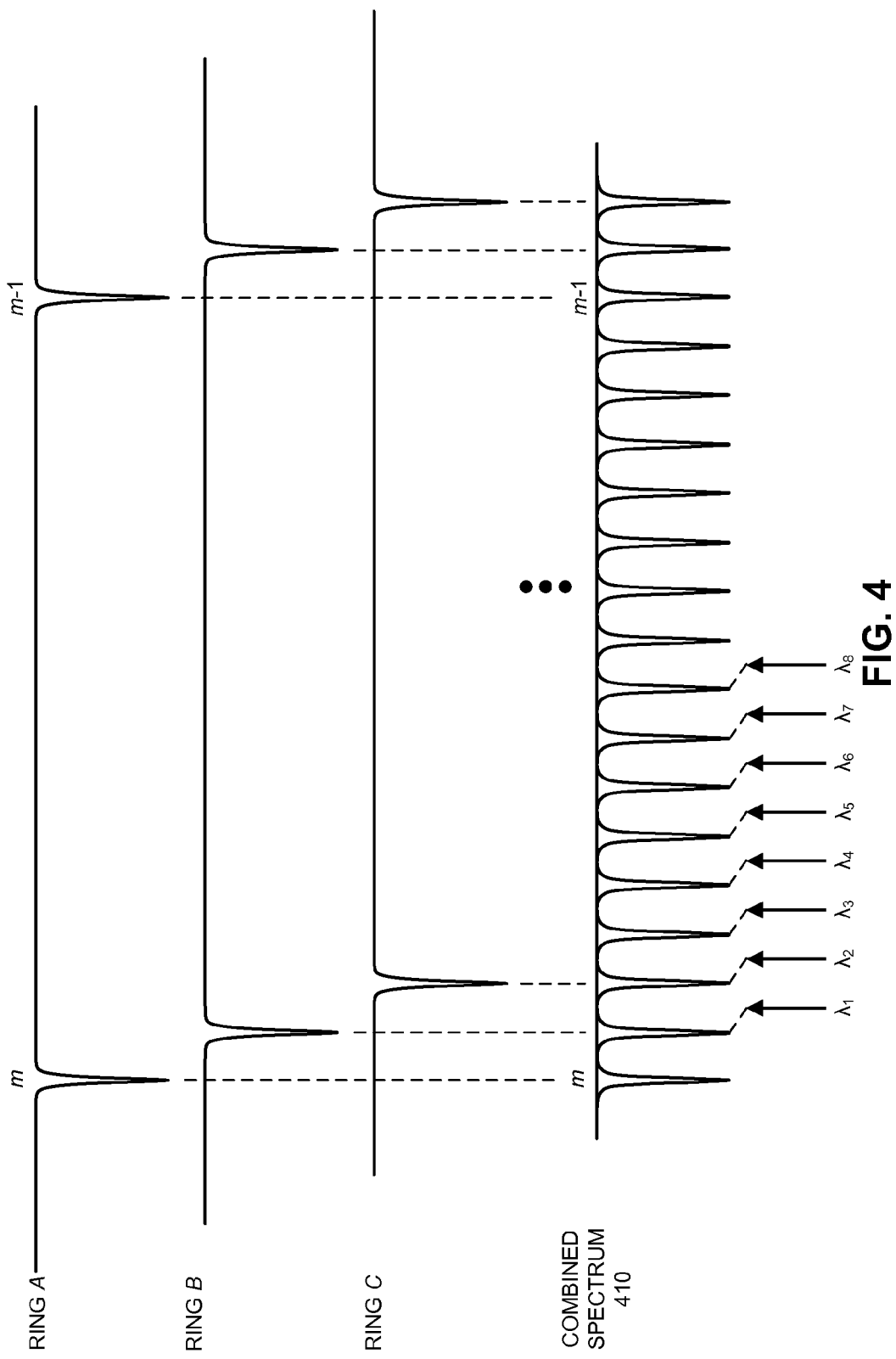
FIG. 4 is a drawing illustrating optical spectra of the optical modulators in the optical devices in FIGS. 1A and 1B in accordance with an embodiment of the present disclosure.

This is shown in FIG. 4, which presents a drawing illustrating optical spectra of transmitter optical modulators 114 (or wavelength drop filters 122) in optical device 100 (FIG. 1A). In this example, there are 8 carrier wavelengths (for 8 corresponding channels) spaced by a channel spacing of $\delta\lambda$. Each ring resonator is designed to have an FSR of around $n\delta\lambda$, and the $m^{th}$ order of their resonances is designed to align with the predefined wavelengths $\lambda_1, \lambda_2, \ldots \lambda_8$. As shown in combined spectrum 410 of the cascaded ring resonators, the resonances of the ring resonators will fill the entire spectral space.

Because of the fabrication variation, the actual $m^{th}$ order of the resonances may be more than 10 nm offset from the targeted operating wavelengths. However, because this offset is typically similar for ring resonators in close proximity (i.e., the resonances of ring resonators in close proximity tend to wander together as a group), combined spectrum 410 of the ring resonators typically remains largely unchanged except for some random channel spacing variation (which is approximately ±1 nm). As shown in FIG. 4, instead of tuning the $m^{th}$ order of ring resonator A to its target operating wavelength $\lambda_1$, control logic 126 (FIGS. 1A and 1B) can assign and tune a resonance of another ring resonator that is the closest to $\lambda_1$, for example, the $m^{th}$ order resonance of ring resonator B. Applying the same approach to the remainder of the carrier wavelengths, the tuning range of the WDM link can be reduced to approximately the channel spacing instead of the whole FSR. In some embodiments, the registration process only needs to be performed once, when the optical device is first turned on. One potential issue is that different resonances may have different extinction ratios due to wavelength-sensitive coefficients. However, experimental results indicate that this difference is small across a wide range of wavelengths.

This configuration technique can effectively and systematically reduce or minimize the total static tuning energy for all of the ring resonators. While dynamically tuning may still be used to address ambient temperature change, this can also be reduced or minimized using appropriate cooling techniques, as is known to one of skill in the art.

As an illustration of the configuration technique, consider a WDM link with 3 carrier wavelengths, 2 nm spacing between the channels, and 10 nm of fabrication variation or uncertainty (for a given fabrication technology). The FSR of the ring resonators may be 6 nm, and the carrier wavelengths may be spread equally across the FSR. Thus, the distance between any two carrier wavelengths is one-third of the FSR. The ring resonators may be designed with slightly different sizes such that the targeted working resonance orders are 2-nm apart. Effectively, the combined spectrum of the three ring resonators may form a comb spectra with 2-nm spacing for a fairly broad wavelength range around the target working resonance order. The actual operating wavelengths will vary because of the fabrication variation of 10 nm. However, this variation may equally affect the rings in a close proximity. In other words, the three ring resonators discussed here may all have a 10-nm operating wavelength shift. Although the designed ring resonance order is 10-nm away, the control logic 126 (FIGS. 1A and 1B) may only need to tune a different order resonance of the ring resonators in an optical modulator to their nearest carrier wavelength, instead of tuning the designed resonance order to its targeted carrier wavelength that is 10-nm away. Because the combined comb spacing is roughly the same as the carrier-wavelength spacing, only 2 nm of maximum tuning per channel may be needed.

Note that this configuration technique works so long as the carrier wavelengths are co-located on an optical waveguide, which allows control logic 126 in FIGS. 1A and 1B to assign the ring resonators to the carrier wavelength(s). In addition, because control logic 126 in FIGS. 1A and 1B can assign the optical modulators on an individual basis, a fixed number of offsets between the carrier wavelengths and the actual operating wavelengths of the ring resonators or errors that span the entire bandwidth can be addressed.

One difficulty in implementing this configuration technique is having the same $m^{th}$ order of the ring resonators designed to align with the carrier wavelengths. For example, consider a WDM link with 8 carrier wavelengths and a channel spacing of 1.6 nm. Suppose that the $120^{th}$ resonance of a ring resonator, which has an FSR of 12.8 nm, a radius of 8.707 μm and an effective index of refraction of 3.4, is targeted at a carrier wavelength of 1550 nm. In order to have a second ring resonator (in another optical modulator) targeted to 1551.6 nm with the same order of resonance, the radius of this ring resonator needs to be 8.716 μm. It may be difficult to fabricate ring resonators with such a small radius difference even with e-beam lithography. One solution to this problem is to have the second ring resonator targeted at the carrier wavelength of the neighboring channel, at say 1551.6 nm, using its $(m+1)^{th}$ order resonance. For an FSR of 12.7 nm, this results in a radius of 8.788 μm. Applying the same design principal to the remainder of the ring-resonator optical modulators, the resonances of the ring resonators will fill the optical spectrum as desired. Note that while identical FSRs may be used for the different ring resonators, small differences in the FSRs over the bandwidth can be tolerated.

In principle, it is statistically possible that a worst-case offset may occur between the actual operating wavelengths and the carrier wavelengths. To prevent this from occurring over multiple instances of transmitters 110 and receivers 120 on a wafer, differences between spacings of the target operating wavelengths of the transmitter optical modulators 114 (FIGS. 1A and 1B) and/or the wavelength drop filters 122 (FIG. 1A) and a spacing of the carrier wavelengths may be designed to provide a Vernier effect. For example, the spacing of the carrier wavelengths may be 9 nm, while adjacent target operating wavelengths of optical modulators may be spaced by 8.8 nm, 9 nm and 9.2 nm. This may ensure that, statistically, over the area of a substrate (such as in an integrated circuit), there is a small variation between the actual operating wavelengths and the carrier wavelengths, which may make it easier to thermally tune the optical modulators, and may reduce the average thermal tuning energy.

Figure 5:
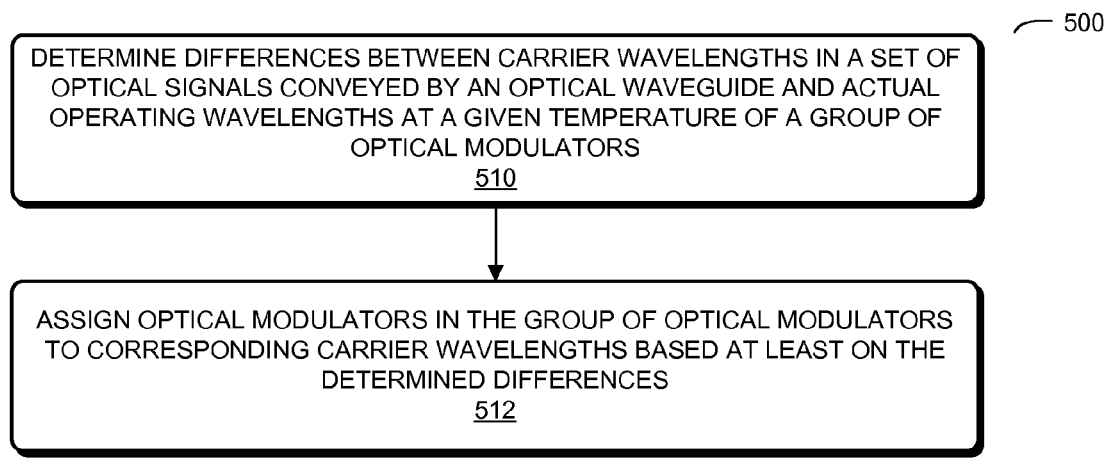
FIG. 5 is a flow chart illustrating a process for configuring the optical devices in FIGS. 1A and 1B in accordance with an embodiment of the present disclosure.

We now describe embodiments of a process for configuring an optical device, such as optical devices 100 (FIG. 1A) and 150 (FIG. 1B). FIG. 5 presents a flow chart illustrating a process 500 for configuring an optical device, which may be performed by control logic 126 (FIGS. 1A and 1B). During this process, the control logic determines the differences between the carrier wavelengths in the set of optical signals and the actual operating wavelengths at the given temperature of the group of optical modulators (operation 510). Then, the control logic assigns optical modulators in the group of optical modulators to corresponding carrier wavelengths based at least on the determined differences, thereby reducing the average thermal tuning energy associated with the heating elements (operation 512).

In some embodiments of process 500, there may be additional or fewer operations. Moreover, the order of the operations may be changed and/or two or more operations may be combined into a single operation.

Figure 6:
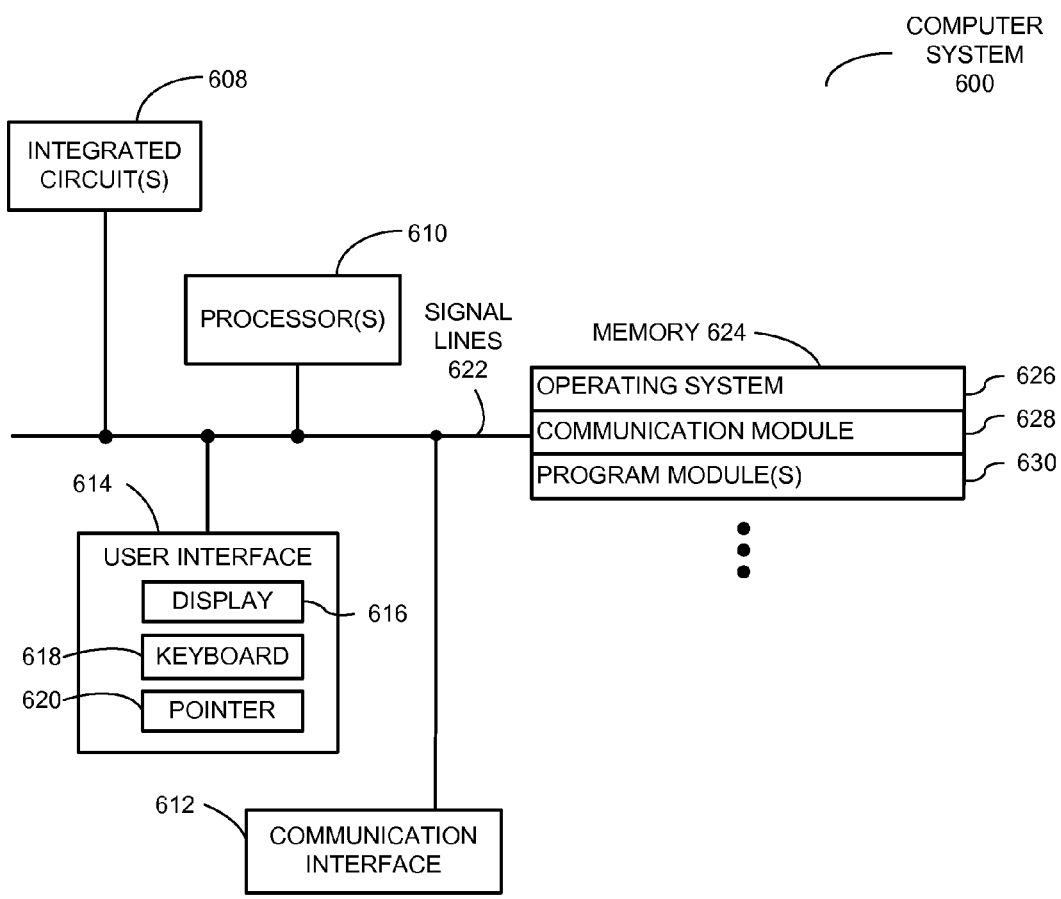
FIG. 6 is a block diagram illustrating a computer system that includes an integrated circuit with one or more of the optical devices in FIGS. 1A and 1B in accordance with an embodiment of the present disclosure.

We now describe embodiments of a computer system. FIG. 6 presents a block diagram illustrating a computer system 600 that includes an integrated circuit with one or more of the optical devices, such as optical device 100 (FIG. 1A) and/or 150 (FIG. 1B). Computer system 600 includes: one or more processors (or processor cores) 610, a communication interface 612, a user interface 614, and one or more signal lines 622 coupling these components together. Note that the one or more processors (or processor cores) 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in the device 600 may include volatile memory and/or non-volatile memory. More specifically, memory 624 may include: ROM, RAM, EPROM, EEPROM, flash, one or more smart cards, one or more magnetic disc storage devices, and/or one or more optical storage devices. Memory 624 may store an operating system 626 that includes procedures (or a set of instructions) for handling various basic system services for performing hardware-dependent tasks. Moreover, memory 624 may also store communications procedures (or a set of instructions) in a communication module 628. These communication procedures may be used for communicating with one or more computers, devices and/or servers, including computers, devices and/or servers that are remotely located with respect to the device 600.

Memory 624 may also include one or more program modules 630 (or a set of instructions). Note that one or more of program modules 630 may constitute a computer-program mechanism. Instructions in the various modules in the memory 624 may be implemented in: a high-level procedural language, an object-oriented programming language, and/or in an assembly or machine language. The programming language may be compiled or interpreted, i.e., configurable or configured, to be executed by the one or more processors (or processor cores) 610.

Computer system 600 may also include one or more integrated circuits 608 that include one or more instances of optical devices 100 (FIG. 1A) and/or 150 (FIG. 1B). For example, the optical devices may be included in a multi-chip module (MCM) (such as a switch or a processor). This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Computer system 600 may include, but is not limited to: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. For example, integrated circuit(s) 608 may be included in a backplane that is coupled to multiple processor blades, or integrated circuit(s) 608 may couple different types of components (such as processors, memory, I/O devices, and/or peripheral devices). Thus, integrated circuit(s) 608 may perform the functions of: a switch, a hub, a bridge, and/or a router. Note that computer system 600 may be at one location or may be distributed over multiple, geographically dispersed locations.

Optical device 100 (FIG. 1A), optical device 150 (FIG. 1B), optical modulator 200 (FIG. 2) and/or computer system 600 may include fewer components or additional components. For example, in inter-chip communication embodiments, transmitter 110-1 (FIGS. 1A and 1B) and receiver 120-1 (FIGS. 1A and 1B) may be implemented on separate substrates, and wavelength drop filters 122 (FIG. 1A) may be assigned to carrier wavelengths by a separate instance of control logic 126 (FIGS. 1A and 1B) on the second substrate. In some embodiments, one or more optical modulators in optical devices 100 (FIG. 1A) and 150 (FIG. 1B) include a double ring resonator.

Moreover, although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of the computer system 600 may be implemented in one or more application-specific integrated circuits (ASICs) and/or one or more digital signal processors (DSPs). Furthermore, functionality in optical device 100 (FIG. 1A), optical device 150 (FIG. 1B), optical modulator 200 (FIG. 2) and/or computer system 600 may be implemented more in hardware and less in software, or less in hardware and more in software, as is known in the art.

While the preceding discussion has used optical modulators as an illustration, in other embodiments the configuration technique may be used in conjunction with a wide variety of optical components in an optical device, such as: an optical filter, an optical multiplexer, an optical de-multiplexer and an optical add/drop. As known to one of skill in the art, a wide variety of fabrication techniques may be used to fabricate optical device 100 (FIG. 1A), optical device 150 (FIG. 1B), and/or optical modulator 200 (FIG. 2).

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. An optical device deposited on a substrate, comprising:
an optical waveguide configured to receive a set of optical signals, wherein a given optical signal has a carrier wavelength, and wherein carrier wavelengths of the set of optical signals span a band of wavelengths;
a transmitter which includes:
transmitter heating elements; and
a group of transmitter optical modulators, optically coupled to the optical waveguide and thermally coupled to corresponding transmitter heating elements that thermally tune the group of transmitter optical modulators, wherein the group of transmitter optical modulators have target operating wavelengths at a given temperature, actual operating wavelengths at the given temperature, and free spectral ranges, and wherein transmitter optical modulators in the group of transmitter optical modulators have different target operating wavelengths, and
wherein the free spectral ranges around the target operating wavelengths encompass the band of wavelengths; and
control logic configured to assign transmitter optical modulators in the group of transmitter optical modulators to corresponding carrier wavelengths based at least on differences between the carrier wavelengths and the actual operating wavelengths, thereby reducing an average thermal tuning energy associated with the transmitter heating elements.

2. The optical device of claim 1, wherein the control logic is configured to assign the transmitter optical modulators to the corresponding carrier wavelengths to minimize the average thermal tuning energy.

3. The optical device of claim 1, wherein the control logic is configured to dynamically assign the transmitter optical modulators to the corresponding carrier wavelengths during operation of the optical device.

4. The optical device of claim 1, wherein the control logic is configured to assign the transmitter optical modulators to the corresponding carrier wavelengths during a calibration mode.

5. The optical device of claim 1, wherein the transmitter optical modulators are spatially cascaded.

6. The optical device of claim 1, further comprising an optical multiplexer that optically couples the group of transmitter optical modulators to the optical waveguide.

7. The optical device of claim 1, wherein the transmitter optical modulators include ring resonators.

8. The optical device of claim 7, wherein the different target operating wavelengths of the group of transmitter optical modulators are associated with different optical path lengths.

9. The optical device of claim 1, wherein differences between spacings of the target operating wavelengths of the transmitter optical modulators and a spacing of the carrier wavelengths provide a Vernier effect.

10. The optical device of claim 1, wherein the number of transmitter optical modulators in the group of transmitter optical modulators equals the number of carrier wavelengths.

11. The optical device of claim 1, wherein the number of transmitter optical modulators in the group of transmitter optical modulators is greater than the number of carrier wavelengths; and
wherein at least one of the transmitter optical modulators in the group of transmitter optical modulators is not assigned to a corresponding carrier wavelength and remains unused during operation of the optical device.

12. The optical device of claim 1, wherein the optical waveguide is configured to receive multiple sets of optical signals having carrier wavelengths that span different bands of wavelengths, which define a spectral range of the optical device;
wherein the optical device further comprises multiple instances of the group of transmitter optical modulators; and
wherein the control logic is configured to assign transmitter optical modulators in a given group of transmitter optical modulators to corresponding carrier wavelengths in a given set of optical signals.

13. The optical device of claim 1, further comprising optical sources, coupled to the optical waveguide, which provide the set of optical signals.

14. The optical device of claim 1, wherein an average tuning range of the transmitter optical modulators is significantly less than one half of an average of the free spectral ranges of the transmitter optical modulators.

15. The optical device of claim 1, further comprising:
a receiver which includes:
receiver heating elements;
a group of wavelength drop filters, optically coupled to the optical waveguide and thermally coupled to corresponding receiver heating elements that thermally tune the group of wavelength drop filters, wherein the group of wavelength drop filters have target operating wavelengths at a given temperature, actual operating wavelengths at the given temperature, and free spectral ranges, wherein wavelength drop filters in the group of wavelength drop filters have different target operating wavelengths, and wherein the free spectral ranges around the target operating wavelengths of the group of wavelength drop filters encompass the band of wavelengths; and
detectors optically coupled to the corresponding wavelength drop filters in the group of wavelength drop filters, wherein the control logic is further configured to assign wavelength drop filters in the group of wavelength drop filters to corresponding carrier wavelengths based at least on differences between the carrier wavelengths and the actual operating wavelengths of the wavelength drop filters in the group of wavelength drop filters, thereby reducing an average thermal tuning energy associated with the receiver heating elements.

16. A computer system, comprising an integrated circuit that includes an optical device, the optical device including:
an optical waveguide configured to receive a set of optical signals, wherein a given optical signal has a carrier wavelength, and wherein carrier wavelengths of the set of optical signals span a band of wavelengths;
a transmitter which includes:
transmitter heating elements; and
a group of transmitter optical modulators, optically coupled to the optical waveguide and thermally coupled to corresponding transmitter heating elements that thermally tune the group of transmitter optical modulators, wherein the group of transmitter optical modulators have target operating wavelengths at a given temperature, actual operating wavelengths at the given temperature, and free spectral ranges, and wherein transmitter optical modulators in the group of transmitter optical modulators have different target operating wavelengths, and
wherein the free spectral ranges around the target operating wavelengths encompass the band of wavelengths; and
control logic configured to assign transmitter optical modulators in the group of transmitter optical modulators to corresponding carrier wavelengths based at least on differences between the carrier wavelengths and the actual operating wavelengths, thereby reducing an average thermal tuning energy associated with the transmitter heating elements.

17. The computer system of claim 16, wherein the transmitter optical modulators include ring resonators.

18. The computer system of claim 16, wherein differences between spacings of the target operating wavelengths of the transmitter optical modulators and a spacing of the carrier wavelengths provide a Vernier effect.

19. The computer system of claim 16, wherein the number of transmitter optical modulators in the group of transmitter optical modulators is greater than the number of carrier wavelengths; and
wherein at least one of the transmitter optical modulators in the group of transmitter optical modulators is not assigned to a corresponding carrier wavelength and remains unused during operation of the optical device.

20. A method for configuring an optical device, wherein the method is performed by control logic in the optical device, the method comprising:
determining differences between carrier wavelengths in a set of optical signals that are conveyed by an optical waveguide and actual operating wavelengths at a given temperature of a group of optical modulators, which are optically coupled to the optical waveguide and thermally coupled to corresponding heating elements that thermally tune the group of optical modulators; and
assigning optical modulators in the group of optical modulators to corresponding carrier wavelengths based at least on the determined differences, thereby reducing an average thermal tuning energy associated with the heating elements.

* * * * *